United States Patent [19]

Lesage et al.

[11] Patent Number: 5,328,496
[45] Date of Patent: Jul. 12, 1994

[54] APPARATUS INCLUDING MOLD HAVING COVERING FOR ANNULAR BENDING/TEMPERING MOLDS

[75] Inventors: Jean-Luc Lesage; Thierry Franco, both of Compiegne, France

[73] Assignee: Saint-Gobain Vitrage International, Courbevoie, France

[21] Appl. No.: 890,782

[22] Filed: Jun. 1, 1992

[30] Foreign Application Priority Data

May 30, 1991 [FR] France .................. 91 06494

[51] Int. Cl.⁵ .................. C03B 23/023; C03B 27/044
[52] U.S. Cl. .................. 65/268; 65/287; 65/288; 65/348; 65/374.1; 65/374.12
[58] Field of Search .......... 65/374.1, 374.12, 374.13, 65/348, 268, 287, 288, 291

[56] References Cited

U.S. PATENT DOCUMENTS

| | | | |
|---|---|---|---|
| 3,694,182 | 9/1972 | Akfirat et al. | 65/288 |
| 3,741,743 | 6/1973 | Seymour . | |
| 4,661,142 | 4/1987 | Bartusel et al. . | |
| 4,678,495 | 7/1987 | Yoshizawa | 65/287 |
| 4,859,225 | 8/1989 | Kuster et al. . | |
| 4,906,271 | 3/1990 | D'Iribarne et al. . | |

FOREIGN PATENT DOCUMENTS

| | | |
|---|---|---|
| 0003391 | 8/1979 | European Pat. Off. . |
| 0186529 | 7/1986 | European Pat. Off. . |
| 0312439 | 4/1989 | European Pat. Off. . |
| 0373992 | 6/1990 | European Pat. Off. . |
| 1065690 | 5/1954 | France . |
| 2009278 | 1/1970 | France . |
| 2567508 | 1/1986 | France . |
| 2621906 | 4/1989 | France . |
| 2644156 | 9/1990 | France . |

Primary Examiner—Joye L. Woodard
Attorney, Agent, or Firm—Oblon, Spivak, McClelland, Maier & Neustadt

[57] ABSTRACT

An apparatus for bending/tempering glass sheets raised to their softening point with a view to their bending and tempering includes an upper plate mold and a lower annular mold on which the glass sheets are deformed, and with respect to which the edge of glass sheets move as a result of their deformation, particularly by horizontal pressing between the upper bending mold and the lower mold. The bent sheets are thermally tempered in air on the same annular mold in a tempering station. This annular mold is designed in such a way that its contact surface with the glass sheets at the start of their deformation on the mold, being located on the outer periphery of the mold, is appropriate for the mark-free displacement of the glass on the mold and in particular for pressing, and so that at the end of displacement, and in particular at the end of pressing, the contact surface located on the inner periphery of said mold is appropriate for tempering.

25 Claims, 2 Drawing Sheets

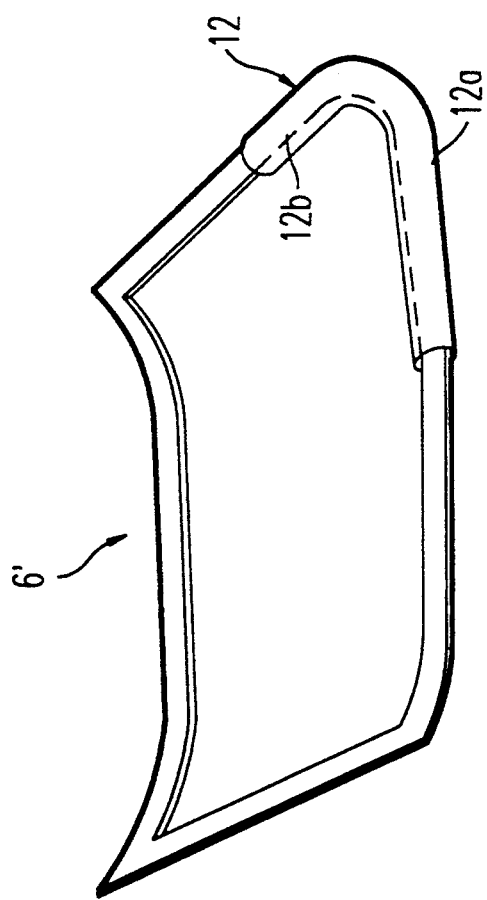

APPARATUS INCLUDING MOLD HAVING COVERING FOR ANNULAR BENDING/TEMPERING MOLDS

BACKGROUND OF THE INVENTION

1. Field of the Invention

The present invention relates to glass sheet bending-/tempering procedures and more particularly to the covering of annular molds used in such procedures.

2. Description of the Related Art

Horizontal bending/tempering procedures generally involve a first bending phase, where the glass sheet previously heated in a furnace to beyond its softening point is, e.g., applied by pneumatic means at least once to an upper member constituted by a refractory ceramic or sheet metal plate. In certain cases, this member is only a carrying means. In other cases it constitutes a shaping or preshaping means for the glass sheet and has a principal curvature which can be more or less close to that which it is wished to give to the glass sheet. However, no matter what its shape and function, hereinafter it will be designated by the term plate bending mold.

Thus, the sheet can be sucked, as is described in EP-A-3,391 and/or raised by an upward, hot gaseous flow, against the bending mold in the manner described in FR-A-2,567,508. It can also be raised by mechanical means such as lugs or a lower mold able to have different configurations, as is described in FR-A-2,009,278.

The more or less preshaped glass sheet can then be deposited in a well known manner on a mold having a curved profile open in its center and which is known as an annular bending bold, before being discharged while on the latter towards the thermal tempering zone. This tempering operation consists of supplying, from two plenums positioned above and below the glass sheet on the annular mold, also called a tempering frame, cooling gas jets which are approximately perpendicular to the two faces of said sheet.

The tempering frame is provided with a coating or covering specifically adapted to this type of tempering and to the stress which is imposes. Thus, the covering, apart from being able to withstand temperatures between 650° and 800° C. and without marking the glass, must be permeable to air so as not to disturb the circulation of the pressurized cooling air from either side of the glass sheet. Thus, the air projected from the lower tempering plenum with respect to the annular plenum supporting the sheet must be able to also flow tangentially along the contact surface between the mold and the sheet, so that the periphery of the sheet is also correctly tempered, which requires a relatively permeable mold covering in order to permit said flow. Various such coverings provided for the tempering frames are known in the art.

It is standard practice to use a refractory fiber or thread gauze with relatively wide meshes of approximately at least 1 mm side length and optionally in the manner disclosed in U.S. Pat. No. 4,906,271, while fixing the meshes by knots at the intersection points, so as to render uniform the distribution of the intersection points which constitute the essential contact points between the mold covering and the glass sheet.

It is also known to complete the shaping of the glass sheet by pressing the sheet between the plate mold above it and an annular bending mold below it. To the extent that pressing involves considerable and relatively sudden mechanical forces imposed on the glass sheet at its periphery supported by the annular mold, the annular mold covering must have very specific characteristics different from those required for the covering of a tempering mold.

Thus, it must have a certain softness so as to permit a gentle contact with the glass sheet and cancel out any slight imperfections of the shape of the mold. It must also be relatively deformable and extensible, so that it can be easily fixed while stretching it over the mold, e.g., using clips or hooks. It must be able to absorb the dust which might be located at the mold/sheet interface and have a certain porosity, so that the dust cannot mark the surface of the softened glass. It must also not mark the glass by its own surface texture.

The covering must therefore have a relatively dense and compact texture, such as is encountered with metallic knitted products with compact meshes, as disclosed in FR-A-2,644,156 and which makes it possible to obtain a contact surface with the glass sheet which is as smooth and level as possible. Thus, during the relative sliding between the glass sheet and the annular mold, there is no risk of marking or scratching the glass sheet. During the actual pressing between the plate mold and the annular mold, such risks are obviated by ensuring a gentle, shock-free contact between the glass and the annular mold.

However, this type of dense texture covering is incompatible with a use as a covering for a tempering mold because, as has been stated hereinbefore, it would not permit an effective tempering of the periphery of the glass sheet, by opposing the tangential flow of the cooling air. It has therefore been necessary to use for tempering and for pressing two annular molds having coverings of different types. However, this involves a supplementary mold exchange stage with all the problems of synchronization and increases in the cycle time which result therefrom.

It is possible to envisage carrying out the glass sheet pressing operation with the frame designed and covered for the thermal tempering operation, but this remains a compromise which is not acceptable from the standpoint of the optical quality of the glazings obtained except when the relative sliding between the glass and the annular mold which leads to the production of marks is very limited, i.e., when only a modest bending has to be given to the glass sheet.

A "bifunctional" annular mold which is suitable for relatively pronounced bending operations without marking the sheets is described in EP-A-373,992. It is an annular mold having a part fixed with respect to the mold support frame and a rail articulated with respect to said fixed part which, on bending back during the pressing against the upper plate mold, makes it possible to obtain glass sheets which are locally highly bent. The fixed part is covered with a gauze having relatively wide meshes allowing tempering to take place, whereas the articulated rail is covered with a dense felt suitable for pressing. During tempering, the same annular mold is used, but then the rail is in the opened out position, so as not to disturb the tempering operation at the highly bent edge of the sheet. This consequently means that the marginal area is left without any support during tempering. This situation is liable to produce parasitic deformations following pressing and account must be taken thereof, e.g., with respect to the curvature of the annular mold and/or the extent of the pressing by the articulated rail, so as to obtain an end product with the desired curvature.

By its very design, this mold is only usable if the desired highly bent area is not very extensive and is limited to a single side of the glass sheet. It is necessary that the glass sheet be supported during tempering by a relatively large fixed part so as to prevent any sagging thereof, said fixed part also being slightly curved and covered with a tempering fabric, pressing essentially taking place via the articulated rail. Consequently this mold is unsuitable for glazings having a complex shape, e.g., those having curvatures in different directions close to two opposite or adjacent edges.

SUMMARY OF THE INVENTION

It is an object of the present invention to provide an annular mold whose contact surface with the glass sheet is suitable both for banding, particularly by pressing, and for thermal tempering using air.

By very carefully and precisely studying the way in which a glass sheet is bent by pressing, it has been found the following phenomena is associated with the relative movement between the glass sheet and the annular mold during the pressing operation. Before the start of pressing, the glass sheet is planar, or may be partly bent due to a prior preshaping by the application of the sheet to the curved upper plate mold. However, in both cases it is curved less than the radially outer edge of the lower annular mold which is adapted to the curvature of the upper plate mold. Therefore the contour of the sheet projects from the annular mold. Consequently the first contact between the sheet and the annular mold takes place between the outer periphery of the annular mold and a very localized part of the glass sheet which does not correspond to the outermost periphery thereof.

The sheet is then progressively pressed by a relative moving together of the lower annular mold and the upper mold, so that the glass sheet becomes increasingly bent. The (convex) surface area of the glass sheet in contact with the annular mold progressively increases toward the radially inner edge of the annular mold and moves towards the outermost periphery of the sheet. Thus, there is a relative radial sliding of the sheet periphery with respect to the width of the edge of the annular mold.

At the end of pressing, the sheet completely adopts the curvature of the edge of the annular mold. It is then in contact by its entire upper face with the plate mold and by the outer periphery of its lower face with the upper surface of the annular mold.

The invention takes advantage of these observations, so as to provide an annular mold suitable both for pressing and the air tempering of glass sheets. During the relative sliding occurring during pressing there is a considerable risk of the glass sheet becoming marked, essentially when said sheet is in contact with the outer periphery of the annular mold, and this danger is greatest at the start of contact between the glass and the mold, where the portion of the glass sheet in contact with the mold has a very small surface area and so must withstand localized high mechanical pressures.

The invention therefore uses the inner periphery of the upper surface of the annular mold as the support surface for the glass sheet during tempering, and only adapts the outer periphery thereof to the pressing operation, or more specifically to the previously explained relative sliding operation preceding the final pressing, or any other bending operation, particularly one using inertia alone, which induces this type of relative displacement between the glass and the annular mold.

In the following description of the invention, the term "pressing" will also be used for designating this relative sliding phase between the annular mold and the glass.

The invention therefore provides an apparatus for bending/tempering glass sheets raised to their softening point comprising upper bending means, more particularly an upper plate mold, and a lower annular mold on which the glass sheets are deformed and with respect to which the edge of said sheets moves as a result of the deformation, particularly by horizontal pressing between the upper bending means and the lower mold, and tempering means where the bent sheets are thermally tempered in air on the same annular mold. This annular mold is designed in such a way that the characteristics of its upper contact surface with the glass sheets are variable in the radial direction. More particularly, the glass sheets, at the start of their deformation on the mold, is located on the outer periphery of said mold which is appropriate for the mark-free displacement of the glass on said mold and in particular for pressing, whereas at the end of displacement and in particular at the end of pressing, the contact surface is located on the inner periphery of said mold which is appropriate for tempering.

In this way there is an advantageous elimination of most of the marking risks, because the sheets encounter an appropriate contact surface, i.e., which is smooth and level, at the start of bending by sliding. Moreover, there is satisfactory tempering at the periphery of the sheet because at the end of the displacement of the glass relative to the mold, particularly by pressing, and up to the end of the tempering operation, it is in contact with a surface appropriate for it and which is sufficiently permeable to air. There is only a need for a single annular mold as a result of this, and in particular a mold such as is conventionally used for tempering, because the latter normally has a significant upper surface radial width so that it is easily possible to distinguish the two aforementioned contact surfaces.

This leads to improvements to the production speed and to a reduction in costs while still giving high quality end products. The regulating and setting times can be reduced by using a single annular mold. Any use of an annular mold requires tedious manual setting and adjusting operations for ensuring the concentricity of the contact surface with the glass and the plate mold, while also ensuring the positioning of said contact surface in the horizontal plane, i.e., what is normally referred to as the "seating" of the mold. In the present invention, instead of using two annular molds, one for bending, particularly by pressing, and the other for tempering, only one mold is used for fulfilling both functions, so that there are required only half of the necessary setting and adjusting times, while simplicity is increased.

The invention is applicable both to an annular mold having a continuous rail and to an annular mold having a segmented rail with, e.g., at least one articulated part mobile with respect to the remainder of the rail.

This highlights an essential advantage of the invention. It sometimes is necessary to carry out pressing with an articulated annular mold. By rotation about an axis of the rail articulated relative to the remainder of the fixed mold, it is possible to curve the glass sheet in a pronounced manner, while avoiding the radial sliding movement between the mold and the glass which gives rise to marking risks. This articulation system, however, has a much more complex operation than that of a fixed mold, because there are relative supplementary movements to be coordinated. However, the present invention permits deep curvatures with a non-articulated annular mold, without marks due to the adapted contact surface, and so it is possible to increase the degree of curvature beyond which it is necessary to have recourse to a complex, articulated annular mold.

Moreover, even with an articulated mold, by providing the articulated annular mold with the covering according to the invention, it is possible to carry out possibly much more complex and/or pronounced bending operations than those conventionally obtained with an articulated mold, while significantly reducing the marking risks for the glass all along said mold, and in particular when the rail is relatively long compared with the rest of the mold.

While it is particularly advantageous to apply the invention to a mold for carrying out a true pressing operation between an upper mold and a lower annular mold, the invention can, a fortiori, be applied with the same degree of success to annular molds used for bending under the effect of gravity only.

In the case where, locally, during the first contact between the annular mold and the glass sheet, part of the latter projects significantly beyond the mold, it is possible to position at this location on the mold a deflector radially extending the mold in accordance with its curvature. The deflector is provided with a smooth contact surface permitting the sliding of the glass, like the surface referred to hereinbefore under the term surface suitable for pressing.

The contact surfaces of the annular mold are obtained by radially juxtaposing, particularly by sewing, two covering types, one suitable for the relative displacement of the glass sheets with respect to the annular mold, particularly by pressing, and the other suitable for tempering. The overall contact surface between the sheets and the annular mold must have a level continuity, so as to prevent any risk of the glass sheet being marked when it slides from one covering to the other. In the same way, one of the two coverings can partly or totally cover the other, so long as the level continuity is ensured.

The invention also relates to a material, in particular used as a covering for an annular mold serving as a support for glass sheets during their bending and tempering, the material having several, in particular two, juxtaposed parts of knitted fabric or gauze. One of the said parts is dense and has a smooth aspect for a contact free from roughness, the other one being very air-permeable.

Preferably the dense part has an air-permeability comprised between 1500 and 15,000 and, in particular, comprised between 4000 and 10,000. The air-permeable part has preferably an air-permeability superior to approximately 15,000.

The air-permeability is defined in the framework of this invention as the number of air liters which can pass through the surface of 10 $cm^2$ of the said material during one hour when projected on it under a pressure of 100 Pa.

The material is for example based on refractory fibers or yarns, preferably stainless steel or nickel/chrome alloy. It can also contain non-metallic fibers or yarns, in particular in ceramics like silica.

This material can be obtained by modification of the knitting of weaving of its structure, which means that it is possible to produce in one step the different parts of the material (dense and air-permeable) by modifying gradually its texture and/or density during for example the weaving or knitting operation.

The invention also relates to an annular mold for supporting glass sheets during their banding and tempering and having on contact with the glass sheets two juxtaposed surfaces, one allowing the mark-free sliding of the edges of the glass sheet thereon, as a result of the deformation of said sheets, particularly by pressing, and the other allowing the thermal tempering in air of the bent glass sheets placed on the mold with the interposing of said covering.

Preferably, the surface of the covering allowing the relative sliding of the glass sheets on the annular mold without any marking taking place, particularly as a result of pressing, is bonded or adhered to the mold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a perspective view of an annular mold having a covering of the present invention, with the covering partially cut away to show the underlying mold.

DETAILED DESCRIPTION OF THE PREFERRED EMBODIMENT

Figure 1:
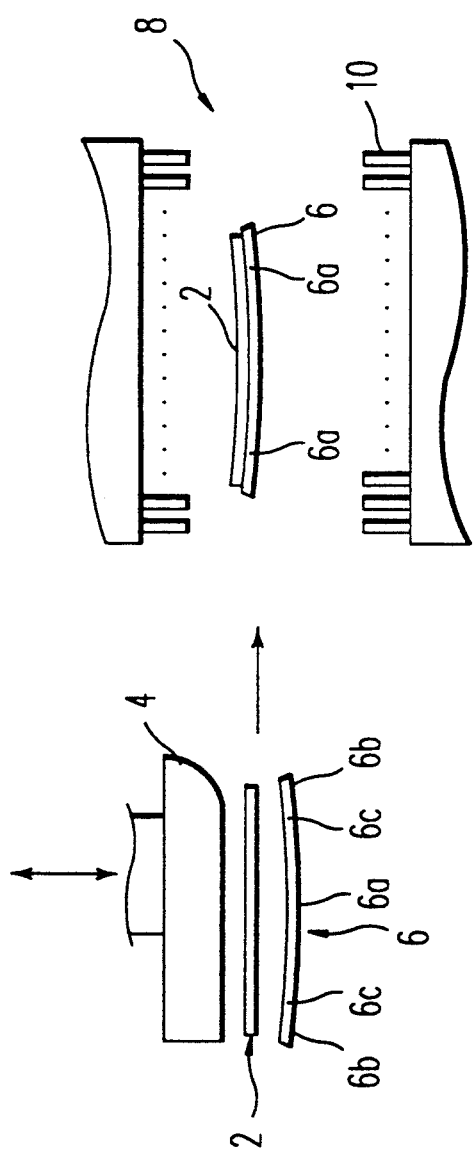
FIG. 1 is a schematic illustration of a bending and tempering apparatus of the type which can use a covering according to the present invention.

The covering according to the present invention is preferably used in an apparatus for bending and tempering glass sheets such as that shown in, for example, U.S. Pat. No. 4,859,225. FIG. 1 schematically illustrates a bending and tempering apparatus in which a glass sheet 2 which has been heated to above its softening temperature is positioned between an upper plate mold 4 and a lower annular mold 6. The annular mold 6 can include a main part 6a and rails 6b which are pivoted to the main part at pivot axes 6c. The upper mold 4 is vertically movable for pressing the glass sheet 2 between itself and the annular mold 6. The annular mold 6 with the bent glass sheet thereon is then transported to a tempering station 8 having air nozzles 10 from which a tempering gas may be discharged onto the bent glass sheet.

The annular mold may preferably be that shown in U.S. Pat. No. 4,661,142. Referring to FIG. 2 in which the annular mold 6' is formed as a single piece (that is, without the pivoted rails as in FIG. 1), at least the upper surface of the annular mold is covered by a covering 12 according to the present invention; the covering is shown partially cut away in FIG. 2. According to the illustrated embodiment of the invention, the covering is constituted by two parallel strips 12a and 12b which may be sewn to one another. The covering may be mechanically fixed, such as by clips, to the annular mold.

In order to give an order of magnitude of the relative widths of these two strips 12a and 12b, the following example is given. If it is wished to cover an annular mold with an upper surface radial width of 60 mm, it would be possible to join a strip 12a suitable for the relative displacement of the glass and the mold, particularly by pressing, having a width of 52 mm and a strip 12b for tempering having a width of 8 mm.

These relative widths are determined as a function of the annular mold in question and the way in which the glass sheet rests on the mold during tempering. Thus, no matter what the radial width of the contact surface with the glass of the annular mold, preferably the surface of the mold suitable for tempering corresponds as close as possible to the glass surface supported by the mold during the tempering operation. Advantageously, the strip 12b is narrow, because widening this strip would involve part of the sliding movement of the glass on the mold taking place on a surface suitable for tempering, which would lead to increased marking risks.

To the extent that any covering conventionally used for pressing and more particularly suitable for the relative displacement of glass sheets with respect to the annular mold during bending, can, according to the invention, be combined with any covering normally used for tempering, without any limitative character, the characteristics of an example of that part 12a of the covering 12 suitable for said relative displacement without marking taking place will be given.

In all the following tables, it is pointed out that the elongation is expressed as a percentage and was measured in accordance with DIN Standard 53857 at 20° C. on a 200×50 mm² sample stretched at a speed of 50 mm/min. The breaking load was measured according to the same Standard and under the same conditions, but at different temperatures, its unit being Newton/5 cm. The air permeability is measured in accordance with DIN/ISO Standard 4022 at 200 Pa and is expressed in $1 \cdot dm^{-2} \cdot mn^{-1}$. The breaking deformability is expressed as a percentage.

Use is made of a covering based on knitted, metallic refractory fibers. Thus, the knitted fabric sold under the names Bekitherm KN/C1/INC 601 and KN/C1/316L, Bekitherm KN/C2/316L and Bakitherm KN/C4/316L by Bekaert Fibre Technologies are adequate and have the following characteristics:

Bekitherm KN/C1/INC 601; nickel-chrome-based alloy,
  Bakitherm KN/C1/316L: stainless steel alloy, which is advantageously used in the case where the annular mold is itself made from 316L alloy, because this avoids any risk of oxidation by a so-called "pile" phenomenon between the metal of the mold and that of the fabric,
  both have a fabric thickness of 1 mm and a weight per unit area of 700 g/m².

|  | 316 L | INC 601 |
| --- | --- | --- |
| Stretchability at rupture |  |  |
| rib direction | 60 | 40 |
| row direction | 90 | 90 |
| Breaking load |  |  |
| rib direction | 300 (20° C.) | 220 (20° C.) |
| row direction | 240 (20° C.) | 120 (20° C.) |

Bekitherm KN/C2/316L is made from stainless steel, has a thickness of 0.88 mm, a weight per unit area of 650 g/m² and a breaking deformability in both directions exceeding 50%.

Bekitherm KN/C4/316L is a nickel-chrome alloy with a thickness of 1 mm, a weight per unit area of 875 g/m² and a deformability identical to that of Bekitherm KN/C2/316L.

Use is advantageously also made of coverings produced by the same company under the names Bakitherm NP 250-316L and Bekitherm NP 250 INC-601 based on the same alloys. It is a fabric structure surrounded on its two faces by a felt layer called Bekinox and which is based on stainless steel. In INC-601 or 316L, they have a similar weight per unit area of 1500 g/m². They have the following physical characteristics:

|  | 316 L | INC 601 |
| --- | --- | --- |
| breaking load | min. 1200 (20° C.) | min. 1100 (20° C.) |
|  | min. 1020 (350° C.) | min. 825 (550° C.) |
| elongation | min. 1 | min. 1 |
| air permeability | max. 250 | max. 250 |

In the same way, any covering strips 12b suitable for tempering can be used. It is therefore advantageous to use a gauze texture based on metallic refractory fibers, as disclosed in FR-A-2,621,906. Preference is given to the use of stainless steel 316 L fibers. The preferred structure of the texture consists of small chains arranged parallel to one another and transversely connected in pairs by filaments. These small chains are obtained from three filaments and each of the filaments is obtained by the association of dozens of unitary fibers. Each mesh of the resulting fabric has a side length of 2 to 8 mm and preferably 3 mm, in view of the strip width taken.

According to another embodiment, a single strip is comprised of a knitted fabric whose mesh structure evolves in such a way that it is done at a portion of the surface suitable for pressing and less dense at the surface portion suitable for tempering. Use is either made of fibers based on stainless steel 316 L, or based on INC 601, which are combined into filaments to allow knitting to take place. This renders superfluous the operation of sewing between the two covering types.

These embodiments in no way limit the scope of the invention. It is therefore possible to combine any covering conventionally specifically used for tempering with any covering specifically used for bending involving a relative displacement between the glass and the mold and in particular for bending by pressing within the scope of the present invention.

The major interest of the invention is that, without making any compromise with regards to the bending quality, particularly by pressing and/or tempering, use is only made of a single annular mold, whose "mixed" covering is adapted to the operations which it must undergo while supporting the glass sheet.

The examples have only been given as illustrations and lead to the desired results, i.e., there is no marking of the bent/tempered glass sheets in the case of the thus covered molds and the periphery of the sheets has a satisfactory tempering level.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for tempering and bending heated products, comprising:

a bending station having an upper bending mold for bending a glass sheet;

a tempering station having tempering means;

a mold member movable between said bending station and said tempering station for transporting a glass sheet bent in the bending station to the tempering station; and a fabric covering positioned to cover at least an upper surface of the mold member, wherein a density characteristic of said fabric covering varies in accordance with the location thereof in at least a radial direction of the mold member.

2. An apparatus for tempering and bending heated products, comprising:

a bending station having an upper bending mold for bending a glass sheet;

a tempering station having tempering means;

an annular mold member movable between said bending station and said tempering station for transporting a glass sheet bent in the bending station to the tempering station, and a fabric covering positioned to cover at least an upper surface of the annular mold member, whereby a characteristic of said fabric covering varies in accordance with a location thereof in at least a radial direction of the annular mold member.

3. The apparatus of claim 2 wherein the characteristic is such that the density of the covering is greater at a radially outer periphery of the annular mold than at a radially inner periphery of the annular mold.

4. The apparatus of claim 3 wherein said covering comprises a knitted fabric having a variable mesh size in the radial direction of the annular mold.

5. The apparatus of claim 3 wherein said covering comprises two radially spaced strips joined at a circumferential line level with the remainder of the covering, said strips being different in at least said characteristic.

6. The apparatus of claim 5 wherein a radially outer one of the strips comprises one from the group consisting of a dense mesh knitted fabric and a felt fabric.

7. The apparatus of claim 5 wherein a radially inner one of the strips comprises one from the group consisting of a gauze and a wide mesh knitted fabric.

8. The apparatus of claim 6 wherein a radially inner one of the strips comprises one from the group consisting of a gauze and a wide mesh knitted fabric.

9. The apparatus of claim 2 wherein the density characteristic is such that the radially outer periphery of the covering is suitable for mark-free displacement of a glass sheet on the mold and the radially inner periphery of the covering is suitable for tempering.

10. The apparatus of claim 9 wherein said covering comprises two radially spaced strips joined at a circumferential line level with the remainder of the covering, said strips being different in at least said characteristic.

11. The apparatus of claim 10 wherein the radial width of the radially inner strip is less than that of the radially outer strip.

12. The apparatus of claim 9 wherein said covering comprises a knitted fabric having a variable mesh size in the radial direction of the annular mold.

13. The apparatus of claim 2 wherein the fabric covering comprises a refractory metallic fiber covering having fibers taken from the group consisting of stainless steel and nickel/chrome alloy.

14. The apparatus of claim 2 wherein said annular mold has an articulated portion.

15. A mold serving as a support for products during bending and tempering, comprising:

an annular mold member having an annular upper surface; and a fabric covering positioned to cover the upper surface, wherein a density characteristic of the covering increases at least from a radially inner periphery of the annular mold member towards a radially outer periphery of the annular mold member.

16. The apparatus of claim 15 wherein said mold member is an annular mold.

17. The mold of claim 16 wherein said fabric covering further has an air permeability characteristic which increases from a radially inner periphery of the annular mold to a radially outer periphery of the annular mold.

18. The mold of claim 17 wherein the air permeability of the fabric covering at the radially inner periphery is 1500 to 15,000 liters/hr/10 cm$^2$ at 100 Pa, and the air permeability of the fabric covering at the radially outer periphery is greater than 15,000 liters/hr/10 cm at 100 Pa.

19. The mold of claim 17 wherein the air permeability of the fabric covering at the radially inner periphery is 4000 to 10,000 liters/hr/10 cm$^2$ at 100 Pa, and the air permeability of the fabric covering at the radially outer periphery is greater than 15,000 liters/hr/10 cm at 100 Pa.

20. The mold of claim 17 wherein the fabric covering comprises a refractory metallic fiber covering having fibers taken from the group consisting of stainless steel and nickel/chrome alloy.

21. The mold of claim 20 wherein the fabric covering further includes silicon fibers or yarns.

22. A fabric covering mounted on an annular mold member and configured to cover an annular upper surface of the annular mold member in a mold serving as a support for products during bending and tempering, wherein the fabric covering has a density characteristic which increases at least from a radially inner periphery of the annular mold member toward a radially outer periphery of the annular mold member wherein said fabric covering further has an air permeability characteristic which increases from the radially inner periphery of the annular mold member to the radially outer periphery of the annular mold member, and wherein the fabric covering comprises a refractory metallic fiber covering having fibers taken from the group consisting of stainless steel and nickel/chrome alloy.

23. The fabric covering of claim 22 wherein the air permeability of the fabric covering at the radially inner periphery is 1500 to 15,000 liters/hr/10 cm$^2$ at 100 Pa, and the air permeability of the fabric covering at the radially outer periphery is greater than 15,000 liters/hr/10 cm$^2$ at 100 Pa.

24. The fabric covering of claim 22 wherein the air permeability of the fabric covering at the radially inner periphery is 4000 to 10,000 liters/hr/10 cm$^2$ at 100 Pa, and the air permeability of the fabric covering at the radially outer periphery is greater than 15,000 liters/hr/10 cm$^2$ at 100 Pa.

25. The fabric covering of claim 22 wherein the fabric covering further includes silicon fibers or yarns.

* * * * *